April 1, 1958  A. CALDERON  2,829,368
APPARATUS TO DELIVER AND FEED MAGNETIC MATERIALS
Filed Feb. 10, 1953  3 Sheets-Sheet 1
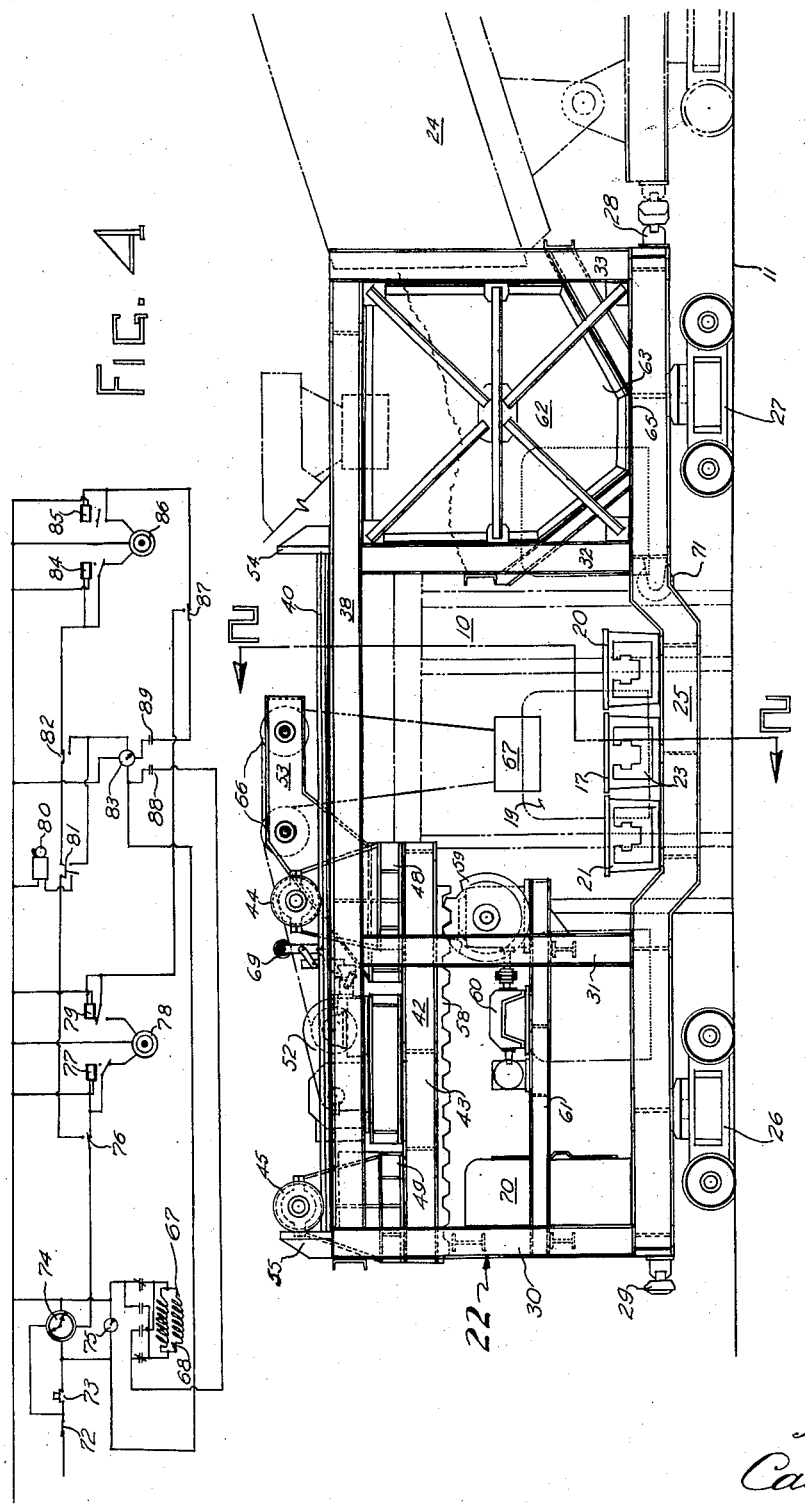
INVENTOR.
Albert Calderon April 1, 1958 A. CALDERON 2,829,368
APPARATUS TO DELIVER AND FEED MAGNETIC MATERIALS
Filed Feb. 10, 1953 3 Sheets-Sheet 2
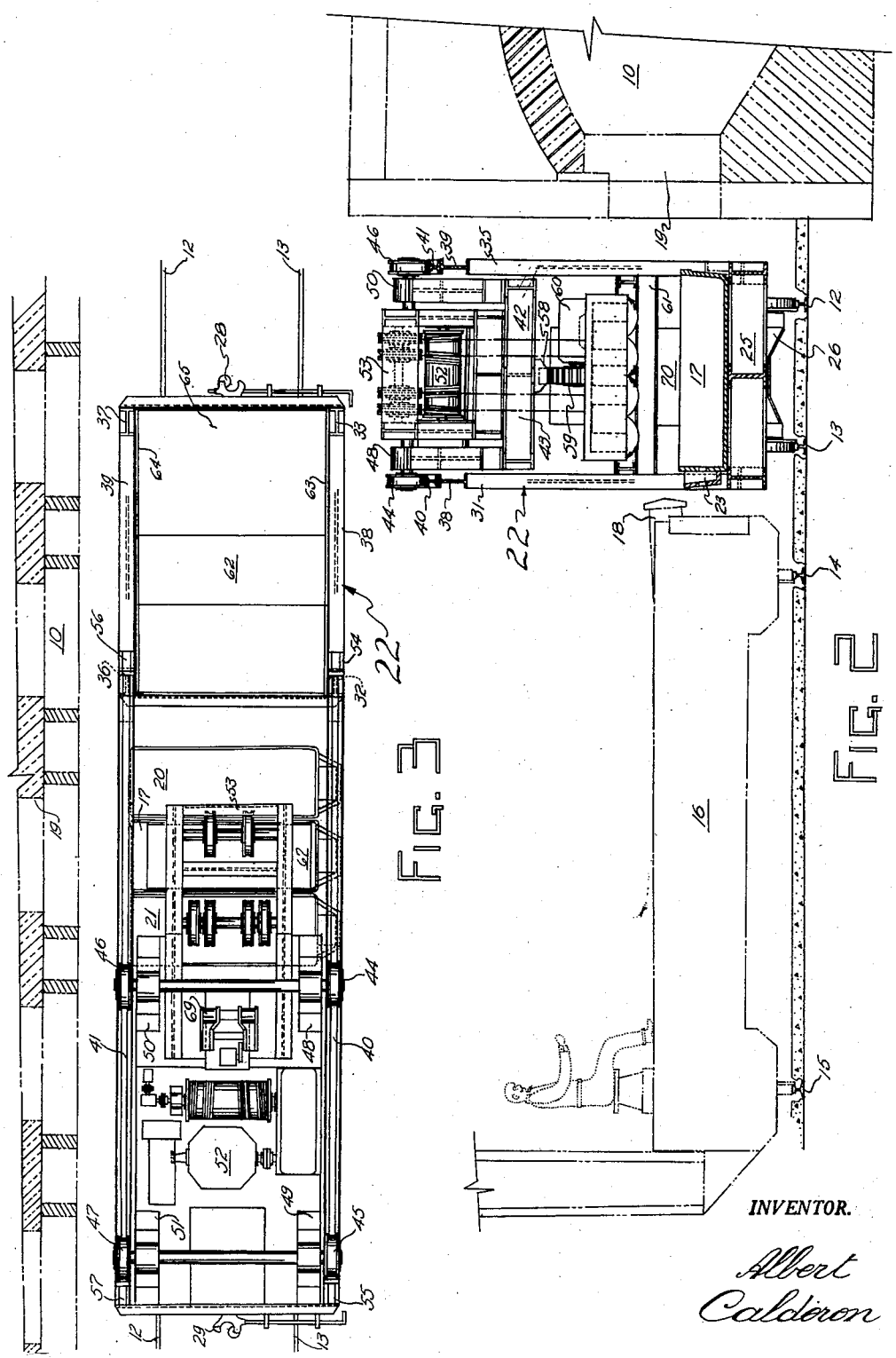
INVENTOR.
Albert Calderon April 1, 1958 A. CALDERON 2,829,368
APPARATUS TO DELIVER AND FEED MAGNETIC MATERIALS
Filed Feb. 10, 1953 3 Sheets-Sheet 3
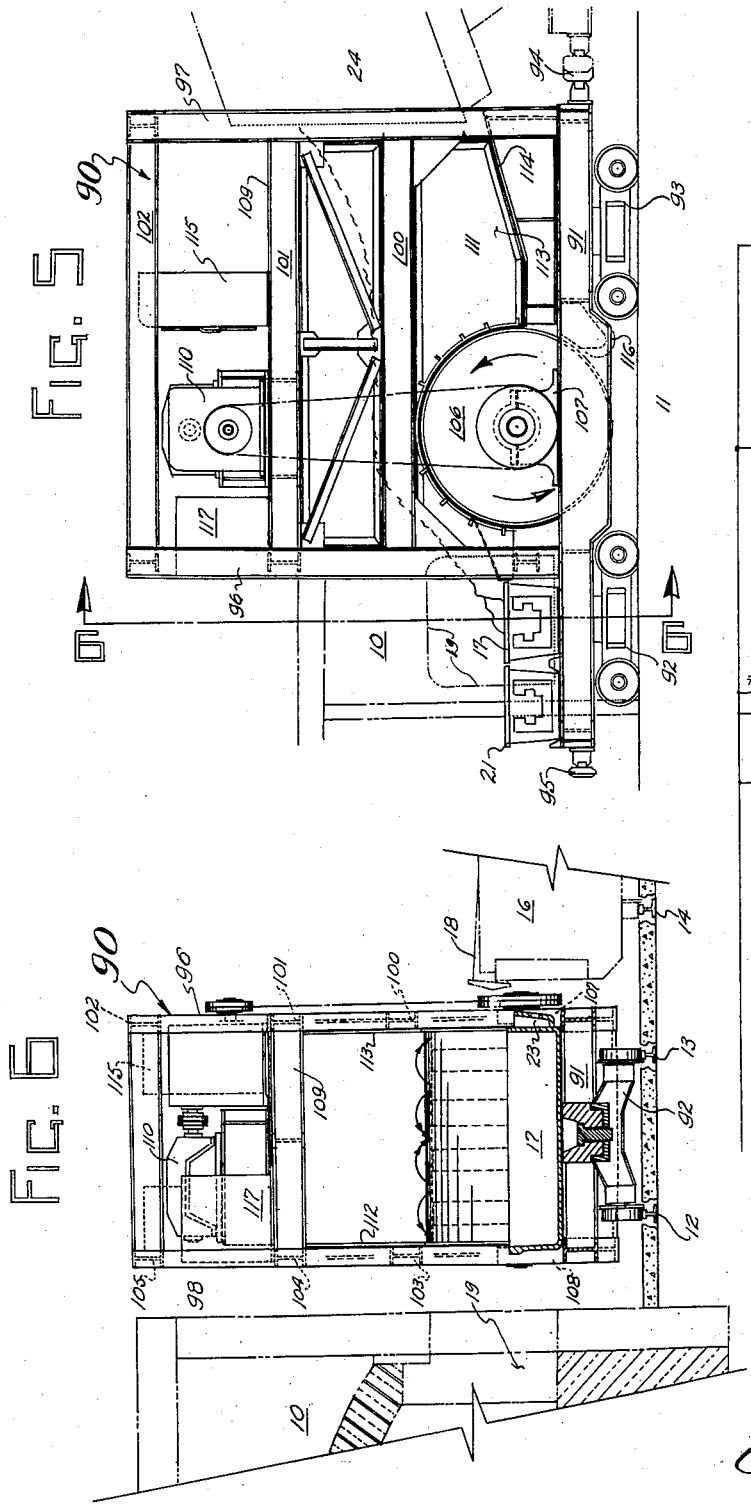
INVENTOR.
Albert Calderon

United States Patent Office 2,829,368
Patented Apr. 1, 1958

2,829,368
APPARATUS TO DELIVER AND FEED MAGNETIC MATERIALS

Albert Calderon, Ravenna, Ohio, assignor to Industrial Automation, Inc., Detroit, Mich.

Application February 10, 1953, Serial No. 336,045

10 Claims. (Cl. 214—18)

This invention relates to the freight hauling vehicle of my pending application for patent filed on December 6, 1952, having Serial No. 324,448, but more particularly to improvements provided for the proper loading of charging boxes on the floor of an open hearth steel plant.

As those skilled in the art of steel making are well aware, charging boxes of roughly the shape of coverless coffins are loaded with magnetic materials in the stockyard and are brought to the charging floor on buggies by means of a locomotive; said buggies run on rails located in front of the furnace to be charged. A charging machine which is of a known form throughout the steel industry, introduces each box successively through a selected door of the furnace to empty the contents thereof. Since the charge of magnetic materials, magnetic materials being hereinafer referred to as "scrap," for an average heat of an open hearth using 50% hot metal is roughly 120 tons, the number of such charging boxes per single charge is so great that it is impractical, if not impossible to bring to the charging floor all the boxes simultaneously, and they are therefore brought in sections or drags, despite which fact a long train of buggies is formed thereby minimizing production by a charging cycle which is too long, causing floor congestion, blocking the doors of the adjacent furnaces, wasting too much heat through the furnace doors and using said charging machine for an excessive length of time.

With the foregoing considerations in mind, the principal object of my invention is to increase production of steel by providing a very efficient apparatus operating in conjunction with scrap delivery cars, which cars form no part of the instant invention, that greatly reduces the length of the present charging time.

Another object of my invention is to leave present facilities unaltered by providing an apparatus that is flexible enough to operate without making changes to existing facilities.

Still another object of my invention is to keep production running at full capacity during the installation of my invention, by providing an apparatus that is mobile and low in height to be assembled where there is no production.

A further object of my invention is to eliminate floor congestion by providing an apparatus operating in conjunction with scrap cars, that eliminates all buggies used in the charging of scrap, and makes possible the bringing of the scrap in bulk form to the furnace charged.

A still further object of my invention is to eliminate the blocking of the doors of the adjacent furnaces by providing an apparatus that occupies little space.

Yet another object of my invention is to drastically reduce the number of charging boxes by providing an apparatus that uses one box repeatedly until becoming red-hot from repetitive insertion into the furnace charged by means of the charging machine, which charging machine forms no part of the instant invention.

It is yet another object of my invention to make possible the use of combustion oxygen remuneratively by providing an apparatus that is very fast in loading a charging box which is repeatedly inserted into the furnace charged.

Therefore another object of my invention is to reduce maintenance of furnace fronts by providing an apparatus that exceedingly cuts down the necessity of the bridge travel of said charging machine and also confines the scrap inside the charging box.

It is therefore another object of my invention to save fuel by providing an apparatus that keeps the furnace doors open for a relatively shorter period of time.

Further yet, an object of my invention is to make possible the reduction in charging machine facilities by providing an apparatus that decreases charging time and thereby employs a charging machine for a relatively short period of time.

Further yet, another object of my invention is to provide orientation means used as a component of the apparatus to orient scrap before being charged so as to obtain some semblance of arrangement in the repeatedly used box, in order to acquire more of a pay-load therein, and also in order to facilitate the insertion of said box into the furnace charged.

It is further yet, another object of my invention to locate said bulk of scrap close to the furnace charged to eliminate hazards from falling scrap and to provide a short travel.

With the above and other objects in view, my invention briefly consists of a carriage movable on track wheels, a supporting framework in the form of a superstructure, a traveling hoisting means adapted to handle scrap, orientation means for proper loading, a temporary storage means, a charging box to receive oriented scrap, confining means in the form of charging boxes to prevent spillage and control means to automatically deliver loads of scrap to said box. In operation, said traveling hoisting means with a magnet, automatically hauls scrap from said storage means and loads said charging box when the operator of the charging machine is in the proper position. During the emptying of said box, said traveling hoisting means fetches another load of scrap. It is estimated that under normal conditions, a load of scrap can be delivered to said box every fifteen seconds, which time is at least twice as fast as conventionally performed. Another structure, is to replace the traveling hoisting means, the orientation means, by an electromagnetic pulley revolving at a certain speed and being adapted to lift scrap from said temporary storage, orient it and feed it into said charging box.

Other objects, purposes and advantages of the present invention will more fully appear or will be understood by those skilled in the art to which this invention pertains, from the following detailed description of certain embodiments thereof. Reference is made to the accompanying drawings forming a part hereof, and in which:

Figure 1 is a front elevation of the apparatus used on the charging floor. The scrap car wherefrom said apparatus obtains scrap and the furnace whereto the scrap is charged are shown in part and in phantom.

Figure 2 is a sectional view taken at 2—2 of Figure 1. It also shows the charging machine and part of the furnace, both in phantom.

Figure 3 is a plan view of the apparatus. It also shows part of the furnace front in phantom.

Figure 4 is a wiring diagram showing one form of wiring arrangement that can be used for operatively connecting certain components of the apparatus to automatically operate them.

Figure 5 is a front elevation of the apparatus using an electromagnetic pulley as the loading and orientation means. The scrap car wherefrom the apparatus receives scrap and the furnace whereto the scrap is charged are shown in part and in phantom.

Figure 6 is a sectional view taken at 6—6 of Figure 5. It also shows the charging machine and the furnace in part and in phantom.

Figure 7 is a wiring diagram showing one form of wiring arrangement that can be used for operatively connecting certain components of the apparatus shown in Figure 5.

Referring to the drawings, 10 is one of several open hearth furnaces which constitute a battery, and 11 is the charging floor in which rails 12 and 13 are imbedded adjacent and parallel to said battery of furnaces. Rails 14 and 15 which are also imbedded in floor 11, are for charging machine 16 whose primary functions are: (1) To repeatedly insert and empty sideways the contents of charging box 17, into furnace 10 by means of peel 18 through any one of the doors, such as door 19. (2) To exchange box 17 for a cold box when it becomes red-hot from repetitive insertion into furnace 10, or when box 20 and/or box 21 becomes full from collecting spillage. (3) To move apparatus 22 from door to door or from furnace to furnace for charging by means of peel 18 locked in socket 23 of box 17.

Apparatus 22 and scrap car 24, which car delivers scrap to floor 11, run on rails 12 and 13 which extend along the whole front of said battery of furnaces and to the stockyard where preparation of scrap and loading of scrap cars, such as car 24, take place.

Apparatus 22, which is made low enough that it can even be removed from floor 11, comprises a base 25, made up of horizontal girders in the form of a rugged bridge construction mounted on track wheels but preferably, on swivel trucks 26 and 27. Base 25 which is substantially rectangular in plan view, is provided with couplers 28 and 29 to make possible the coupling to scrap car 24 and to a locomotive (not shown).

Vertical columns 30, 31, 32, 33, 34, 35, 36 and 37 are extended from base 25; horizontal beam 38 is disposed to the top of columns 30, 31, 32 and 33, and horizontal beam 39 is disposed to the top of columns 34, 35, 36 and 37. For stiffness, horizontal cross-members tie the columns together to form a sturdy superstructure. On top of the flanges of beams 38 and 39, rails 40 and 41 are laid respectively to provide a track for hoist 42, which hoist comprises platform 43, suspended from track wheels 44, 45, 46 and 47 by means of pedestals 48, 49, 50 and 51, a hoisting rig 52 and a boom 53, both rig and boom being located on platform 43. Stops 54, 55, and stops 56, 57 are located at the respective ends of rails 40 and 41 in order to prevent any overtravel of hoist 42. On the underneath side of platform 43, gear rack 58 is mounted to engage with pinion 59 of drive 60, which drive serves to move hoist 42 to and fro. Horizontal beam structure 61 is provided among columns 30, 31, 34 and 35 to support drive 60.

Among columns 32, 33, 36 and 37, temporary storage means 62 is disposed. tI comprises sides 63 and 64, and bottom 65. It is preferred to have sides 63 and 64 extending vertically to an adequate height in order to prevent spillage, and to have bottom 65 sloping with angles greater than the angle of repose of scrap, towards the center thereof. Stiffening members are provided to sides 63, 64 and to bottom 65 to withstand the shock and abuse caused by scrap.

At the cantilevered end of boom 53, lifting electromagnet 67 is suspended by means of cables supported over appropriate sheaves 66, leading to the drum of hoisting rig 52. Loose-cable limit-switch mechanism 69 is provided to engage with the cables in order to be actuated through the loosening of the cables when electromagnet 67 rests on the scrap in temporary storage 62. The actuation of switch mechanism 69 makes it possible for electromagnet 67 to automatically lift scrap from storage 62 at all times despite the variable level of scrap within storage 62. Electromagnet 67 is preferably rectangular in shape and multi-polar with the magnetic lines of force travelling from pole to pole across the length thereof to align long pieces of scrap along the length thereof and permit said pieces to fall likewise, with some semblance of arrangement, into charging box 17, thereby making it possible to obtain maximum compactness and reduce spillage. It is preferred further, to have a plurality of coils within electromagnet 67 in order to vary the lifting capacity thereof to thereby handle the various densities of scrap. The electrical control means, including control cabinet 70 and cable reel 71 are suitably mounted on apparatus 22, and preferably, apparatus 22 is connected to charging machine 16 from where it is operated.

In operation, assuming that it is desired to charge furnace 10 with scrap, the operator of charging machine 16, by means of peel 18, moves apparatus 22 to furnace 10 and locates the center of box 17 with the center of door 19 through which charging will start. Scrap car 24 is brought to charging floor 11 by the locomotive (not shown) and is coupled to apparatus 22 by means of coupler 28. The body of scrap car 24 is tilted either by self contained means or by one of the hot-metal cranes (not shown) which run up and down floor 11, to unload scrap into storage 62.

The second helper of furnace 10 whose main duty is to open and close the doors during charging, makes electrical connection by means of reel 71 to charging machine 16, and he next signals to the operator of charging machine 16 that charging can begin.

Referring to Figure 4 for the detailed description of the operation, the position of electromagnet 67 being over charging box 17, the operator of machine 16 closes main switch 72 and initiates the cycle by pressing on button 73. The following takes place: Timer 74, through cam-limit switch 76, starts motor 78 of drive 60 to move hoist 42 by means of pinion 59 engaging with rack 58. When hoist 42 reaches the end of the lateral travel, switch 76 opens, thereby stopping motor 78 by means of relay 77, but motor 86 of hoisting rig 52 is started in order to turn the drum and lower electromagnet 67 into storage 62. At the time that electromagnet 67 rests on the scrap, the cables from said drum become loose and loose-cable limit-switch mechanism 69 operates to open switch 82. The opening of switch 82, stops motor 86 by means of relay 84, and starts timer 83 which immediately energizes electromagnet 67 by closing contacts 88 to pick scrap. After a short time delay, timer 83 closes contacts 89 to start motor 86 to raise electromagnet 67 through relay 84. At the end of the upward lift, limit-switch 87 is opened and through relay 79, motor 78 is driven to move hoist 42 toward charging box 17. When electromagnet 67 is over box 17, limit-switch 76 closes and the cycle is completed, but electromagnet 67 with a load of scrap, is in position to drop it as soon as the operator of machine 16 presses on button 73. Pressure on button 73 actuates reverse polarity time-relay 75 thus reversing the polarity of electromagnet 67 momentarily to dissipate any residual magnetism induced in the scrap and next completely de-energize it; in addition to de-energizing electromagnet 67, button 73 starts timer 74 which initiates a new cycle of acquiring a load of scrap from temporary storage 62. The reversal of polarity permits the load to drop instantaneously into box 17. While the operator of machine 16 inserts box 17 into furnace 10, electromagnet 67 acquires another load of scrap automatically and is in position waiting for the operator to initiate another cycle.

The operation of acquiring scrap from storage 62 proceeds until the complete contents of the body of car 24 are used. Since the body of car 24 is kept in the tilted position, scrap advances to storage 62 automatically. Bell 80 is provided in the system to ring when electromagnet 67 reaches the bottom of storage 62. The ringing, which tells that the scrap has been depleted, is accomplished by cam-limit switch 81 connected to the drum of hoisting rig 52. Switch 68 is used to throw into or out of the circuit, coils of electromagnet 67 is order to vary the strength thereof.

The alternate construction of my invention is shown by apparatus 90. It comprises a base 91, made up of horizontal girders in the form of a rugged bridge construction, mounted on track wheels but preferably, on swivel trucks 92 and 93. Base 91 which is substantially rectangular in plan view, is provided with couplers 94 and 95 to make possible the coupling to scrap car 24 and to a locomotive (not shown).

Vertical columns 96, 97, 98 and 99 (not shown) are extended from base 91; horizontal beams 100, 101, 102 and 103, 104, 105 are respectively disposed between columns 96, 97 and 98, 99. Also cross-members are spanned between columns 96, 98 and between columns 97, 99. At about the center of base 91, electromagnetic pulley 106 is rigidly mounted by means of pillow blocks 107 and 108. Between beams 101 and 102, platform 109 is provided to serve as a mounting for drive 110, which drive turns pulley 106 in the direction shown.

Beyond pulley 106 and towards truck 93, temporary storage means 111 is disposed. It comprises sides 112 and 113, and bottom 114. It is preferred to have sides 112 and 113 extend vertically to an adequate height and be mounted in such a way that pulley 106 nests inside the space confined by sides 112 and 113, and to have bottom 114 incline towards the face of pulley 106 with an angle greater than the angle of repose of scrap. Stiffening members are provided to sides 112, 113 and to bottom 114 in order to withstand the shock and abuse caused by scrap. Temporary storage 111 receives scrap from the body of car 24.

Beyond pulley 106 but towards truck 92 charging boxes 17 and 21 are provided on base 91. Charging box 17 serves for repetitive use and charging box 21 for collecting spillage and for an easy exchange when box 17 becomes red-hot from repetitive insertion into furnace 10. A short apron chute is disposed between box 17 and pulley 106 to close the gap existing therebetween. Pulley 106 is preferably, multi-polar and having the magnetic lines of force travelling from pole to pole across the face thereof in order to align long pieces of scrap and permit said pieces to fall likewise, with some semblance of arrangement, into charging box 17, thereby obtaining maximum capacity and reducing spillage. The electrical control means, including control cabinet 115 and cable reel 116 are suitably mounted on apparatus 90, and preferably, apparatus 90 is electrically connected to machine 16 from where it is operated.

In operation, assuming that it is desired to charge furnace 10 with scrap, the operator of machine 16, by means of peel 18, moves apparatus 90 to furnace 10 and locates the center of box 17 with the center of door 19 through which charging will start. Scrap car 24 is brought to charging floor 11 by the locomotive (not shown) and is coupled to apparatus 90 by means of coupler 94. The body of scrap car 24 is tilted to unload scrap into storage 111. The second helper of furnace 10, makes electrical connection by means of reel 116 to machine 16 and signals to the operator thereof that charging can begin.

Referring to Figure 7, for the detailed description of the operation, the operator of machine 16 closes main switch 118 which starts master-timer 120 and motor 124 of drive 110 through closed switch 123 and closed contacts of relay 122. The rotary motion of motor 124 through appropriate reduction, is transmitted to pulley 106 in the direction shown by the arrows. He next presses on button 119 which sets timer 120 which in turn energizes pulley 106 through the closed contacts of reverse polarity time-relay 121. Since pulley 106 is revolving and since it is energized it carries scrap from storage 111 over and towards box 17. Timer 120 times out after a pre-set time delay to de-energize pulley 106 with the reversal of the polarity thereof through time-relay 121, and thereby permit it to release the scrap carried over to box 17. The rotary speed of pulley 106 and the setting of timer 120 are co-ordinated in order to feed fairly good loads into box 17. Since the magnetic lines of pulley 106 travel from pole to pole across the face thereof, long pieces of scrap are forced to orient themselves before being released. As soon as box 17 is loaded, the operator of machine 16, inserts it into furnace 10 and empties the contents thereof, and when box 17 is outside of furnace 10 and is ready for another load, the operator presses on button 119 and box 17 is loaded again as described above. The operation of acquiring scrap from storage 111 proceeds until the complete contents of the body of car 24 are used. Since the body of car 24 is in the tilted position, scrap advances automatically to storage 111.

With both arrangements described hereinbefore, the operator of machine 16 keeps using box 17 until it becomes red-hot; boxes 20 and 21 serve to provide an easy exchange for box 17. Boxes 20 and 21 also serve to collect spillage. To obtain proper distribution of the charge within furnace 10, the number of trips performed to empty box 17 is the same through each door. When car 24 is emptied a second car, similar to it, takes its place.

While I have described quite precisely preferred designs and arrangements of an apparatus to load charging boxes, it is to be understood that various modifications and substitutions of equivalents may be made by those skilled in the art without departing from the invention; therefore, I do not mean to confine myself to the exact details of construction and to the exact use herein disclosed, but claim all variations falling within the purview of the appended claims.

I claim:

1. In a system for charging magnetic material into steel making furnaces situated side by side in battery form, a loading apparatus having, in combination, a base mounted on a set of wheels to serve as a carriage; a superstructure extending upwardly from said carriage to serve as a supporting framework; a loading means adapted to handle magnetic material, disposed to said superstructure; a storage means wherefrom said loading means obtains magnetic material, and a charging container being on said carriage and adjacent to said storage means, to be loaded repeatedly with magnetic material and be emptied into the furnace charged.

2. In a system for charging magnetic material into steel making furnaces situated side by side in battery form, a loading apparatus having, in combination, a base mounted on a set of track wheels to serve as a carriage; a superstructure extending upwardly from said carriage to serve as a supporting framework; a traveling hoisting means disposed to said superstructure, having an electromagnetic means; a storage means wherefrom said electromagnetic means obtains magnetic material, and a charging container being on said carriage and adjacent to said storage means, to be loaded repeatedly with magnetic material and be emptied into the furnace charged.

3. In a system for charging magnetic material into steel making furnaces situated side by side in battery form, a loading apparatus having, in combination, a base mounted on a set of track wheels to serve as a carriage; coupling means attached to said carriage; a superstructure extending upwardly from said carriage to serve as a supporting framework; a set of rails with end-stops mounted on top of said superstructure; a traveling hoisting means equipped with an electromagnet, adapted to travel a definite distance on said set of rails; a storage means wherefrom said electromagnet obtains magnetic material, and a charging container being on said carriage and adjacent to said storage means, to be loaded repeatedly with magnetic material and be emptied into the furnace charged.

4. In a system for charging magnetic material into steel making furnaces situated side by side in battery form, a loading apparatus having, in combination, a base mounted on a set of track wheels to serve as a carriage; coupling means attached to each end of said carriage; a superstructure extending upwardly from said carriage to serve as a supporting box-like framework; a set of rails with end-stops mounted on top of said superstructure; a temporary storage means; a traveling hoisting means adapted to travel a definite distance on said set of rails, having a platform suspended from a set of track wheels, a hoisting drum with a drive mounted on said platform, a cantilevered boom extending from said platform and a gear rack disposed thereunder; a drive with a pinion gear to move said hoisting means to and from said temporary storage means; a lifting electromagnet suspended from said boom, adapted to lift magnetic material automatically at all times despite the variable level of magnetic material contained within said temporary storage means, and a charging container being on said carriage and adjacent to said storage means, to be loaded repeatedly with magnetic material and be emptied into the furnace charged.

5. In a system for charging magnetic material into steel making furnaces situated side by side in battery form, a loading apparatus having, in combination, a base mounted on a set of track wheels to serve as a carriage; coupling means attached to each end of said carriage; a superstructure extending upwardly from said carriage, consisting of vertically and horizontally disposed members tied together structurally in the form of a box-like supporting framework; a set of rails with end-stops, mounted on top of said superstructure; a storage means disposed to said superstructure to contain magnetic material temporarily; a traveling hoisting means adapted to travel a definite distance on said set of rails, having a platform suspended from a set of track wheels, a hoisting drum with a drive mounted on said platform, a cantilevered boom extending from said platform and a gear rack disposed thereunder; a drive with pinion gear to move said hoisting means to and from said storage means; a lifting electromagnet suspended from said boom, adapted to lift magnetic material; a mechanism operative by loose-cable action to permit said electromagnet to lift magnetic material automatically despite the variable level of magnetic material contained within said storage means; a first container being located on said carriage and adjacent to said storage means, to be loaded repeatedly with magnetic material from said storage means and be emptied into the furnace charged; another charging container located on the side of said first container for catching spillage and for providing an easy exchange; control means to perform the fetching of magnetic material from said storage means automatically, and means connectable to a source for acquiring electrical power.

6. In a system for charging magnetic material into steel making furnaces situated side by side in battery form, a loading apparatus having, in combination, a base mounted on a set of track wheels to serve as a carriage; coupling means attached to each end of said carriage; a superstructure extending upwardly from said carriage, consisting of vertically and horizontally disposed members tied together structurally in the form of a box-like supporting framework; a set of rails with end-stops, mounted on top of said superstructure; a storage means disposed to said superstructure to contain magnetic material temporarily; a traveling hoisting means adapted to travel a definite distance on said set of rails, having a platform suspended from a set of track wheels, a hoisting drum with a drive mounted on said platfrom, a cantilevered boom extending from said platform and a gear rack disposed thereunder; a drive with a pinion gear to move said hoisting means to and from said storage means; a lifting electromagnet having a plurality of poles with the magnetic lines of force thereof traversing from pole to pole across the length thereof to force the alignment of long pieces of magnetic material, being suspended from said boom; a mechanism operative by loose-cable action to permit said electromagnet to lift magnetic material automatically at all times despite the variable level of magnetic material contained within said storage means; a first charging container being on said carriage and adjacent to said storage means, to be loaded repeatedly with magnetic material from said storage means and be emptied into the furnace charged; another charging container located on the side of said first charging container for catching spillage and for providing an easy exchange; control means to perform the fetching of magnetic material from said storage means automatically, and means connectable to a source for acquiring electrical power.

7. In a system for charging magnetic material into steel making furnaces situated side by side in battery form, a loading apparatus having, in combination, a base mounted on a set of wheels to serve as a carriage; a superstructure extending upwardly from said carriage to serve as a supporting framework; a storage means adapted to contain magnetic material temporarily; a magnetic pulley means being mounted in such a way that it nests within said storage means; a driving means to rotate said magnetic pulley means; control means to energize and de-energize said pulley means, and a charging container being on said carriage, to be loaded repeatedly with magnetic material from said storage means and be emptied into the furnace charged.

8. In a system for charging magnetic material into steel making furnaces situated side by side in battery form, a loading apparatus having, in combination, a base mounted on a set of track wheels to serve as a carriage; coupling means attached to each end of said carriage; a superstructure extending upwardly from said carriage to serve as a supporting framework; a temporary storage means disposed to said superstructure; an electromagnetic pulley being mounted in such a way that it nests within said temporary storage means, having the magnetic lines of force traversing in the direction parallel to its shafting so that long pieces of scrap are forced to orient and lie in said direction; a driving means to rotate said electromagnetic pulley; control means to energize and de-energize said pulley, and a charging container located on said carriage, to be loaded repeatedly with magnetic material from said storage means and be emptied into the furnace charged.

9. In a system for charging magnetic material into steel making furnaces situated side by side in battery form, a loading apparatus having, in combination, a base mounted on a set of track wheels to serve as a carriage having the direction of travel thereof parallel to said battery; coupling means attached to each end of said carriage; a superstructure extending upwardly from said carriage, consisting of vertically and horizontally disposed members tied together structurally in the form of a box-like framework; a hopper-like structure disposed to said superstructure to serve as a temporary storage means, having the bottom thereof declined more than the angle of repose of magnetic material; an electromagnetic pulley being mounted in such a way that part of said pulley nests within said hopper-like structure and being adapted to carry over magnetic material, said pulley having the magnetic lines of force traversing parallel to its shafting so that long pieces of scrap are forced to orient and lie parallel to said shafting; a driving means to rotate said pulley; electrical control means to automatically energize and de-energize said pulley; a chute declined more than the angle of repose of magnetic material, disposed to the delivery end of said pulley, and a charging container being on said carriage to be loaded repeatedly from said hopper-like structure and be emptied into the furnace charged.

10. In a system for charging magnetic material into steel making furnaces situated side by side in battery form, a loading apparatus having, in combination, a base rigidly constructed and rectangular in plan, being mounted on a set of track wheels to serve as a carriage and having the direction of travel thereof parallel to said battery; coupling means attached to each end of said carriage; a superstructure extending upwardly from said carriage consisting of vertically and horizontally disposed members tied together structurally in the form of a box-like framework; a hopper-like structure disposed to said superstructure to serve as a temporary storage means, having the bottom thereof declined more that the angle of repose of magnetic material; an electromagnetic pulley being mounted on said carriage in such a way that it nests within said hopper-like structure and being adapted to carry over magnetic material from said hopper-like structure, said pulley having the magnetic lines of force traversing in the direction parallel to its shafting so that long pieces of scrap are forced to orient and lie parallel to said shafting; a driving means to rotate said electromagnetic pulley; electrical control means to automatically energize and de-energize said pulley; a chute declined more than the angle of repose of magnetic material, disposed to the delivery end of said pulley to direct oriented magnetic material; a first charging container being on said carriage, to be loaded from said hopper-like structure with magnetic material by means of said pulley and be emptied into the furnace charged, and another charging container located adjacently to said first charging container to catch spillage and make possible an easy exchange when said container becomes red-hot from its repetitive insertion into said furnace charged.

References Cited in the file of this patent

UNITED STATES PATENTS 2,579,409     White _____ Dec. 18, 1951